F. CLYMER.
Tree-Protector.
No. 59,967.
Patented Nov. 27, 1866.
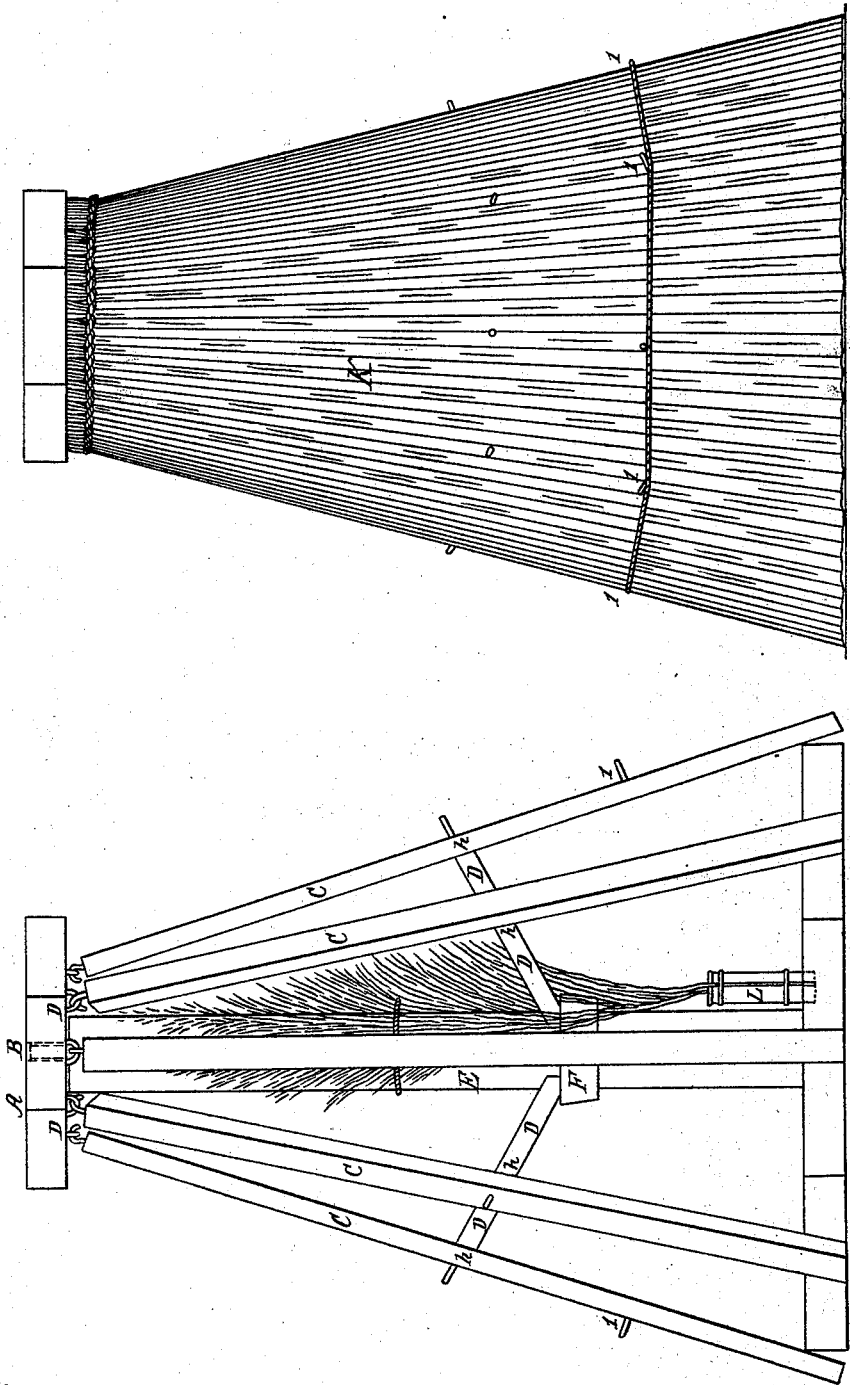
Witnesses:
A. M. Jackson
J. W. Coulter
Inventor:
Francis Clymer.

United States Patent Office.

TREE PROTECTOR.

FRANCIS CLYMER, OF GALION, OHIO.

*Letters Patent No. 59,967, dated November 27, 1866.*

SPECIFICATION.

TO ALL WHOM IT MAY CONCERN:

Be it known that I, FRANCIS CLYMER, of Galion, in the county of Crawford, in the State of Ohio, have invented a new and improved mode of Protecting Fruit and Fruit Trees from frost; and I do hereby declare that the following is a full and exact description thereof, reference being had to the accompanying drawings, and to the letters of reference marked thereon.

The nature of my invention consists in providing a portable frame of slats, fastened by hooks and staples at the upper ends, under a circular board top, the lower ends standing on the ground or set in the ground, and making a conical shape to set over trees, and around which to lash suitable covering of thatch, hemp, straw, or corn fodder, as a shield and protection against the rigors of winter and frost; also a device of sheet tin or lead wrapped around the lower part of the trunk of the tree, larger in circumference than the trunk of the tree, so that it will lap over, and tied with an India-rubber or other elastic band, which will enlarge and permit the sheet metal to enlarge as the tree expands by growth. The object of this second device is to protect the trunk of the tree from mice, rats, gophers, and other vermin, which might be attracted to take winter quarters in the shelter afforded by my invention to the trees, as aforesaid, whilst at the same time, as a secondary advantage, said sheet metal protection being set a short distance below the surface of the earth about the tree, may be left in the summer around the trees, especially peach trees, to protect them against the ravages of the worm known as the peach grub.

To enable others skilled in the art to make and use my invention, I will proceed to describe its construction and operation.

For an ordinary-sized fruit tree, not too large, and especially those trimmed with reference to my invention, for their protection, I use my frame constructed as follows:

I drive a slender stake, E, as shown in the drawings, into the ground by the tree and let it project above the tree; on the top of which stake is set a circular board, under which, at D D, &c., and driven into the same, are iron staples corresponding to the number of slats hereinafter described. Slats of wood, C C, &c., as shown in the drawings, of suitable length, are taken; the lower end resting on the ground or sharpened and driven slightly into the ground; the upper ends having wire hooks attached. Into said staples are hooked the upper ends of the slats by means of the hooks aforesaid, the height of the stake, E, and the length of the slats, C C, &c., being such as to make the frame, when standing, of a conical shape and covering the tree. For cheapness, instead of the hooks and staples aforesaid, I have holes bored in the circular board roof at D D, &c., and the upper ends of the slats, C C, &c., I cut in the shape of wooden pins with shoulders to set into said holes. Through the centre of the circular roof, A, is a hole at B. In the top of the stake, E, is firmly set a wooden pin or iron bolt, J, somewhat smaller than the hole, B, so that the roof A may slide up and down, as the frost heaving the ground raises the slats and frame-work aforesaid. In the event of the tree being tall and the slats of great length, I use slender wooden braces, D D, &c., as exhibited in the drawings, leading from the slats, C C, &c., to the stake, E, about midway in the slats. Around the stake E, at F, is nailed a cleat or rim, on which the inner ends of the braces rest. The outer ends of said braces rest against said slats at h, and are fastened thereto by wooden pins or iron bolts, securely fastened to the outer ends of said braces, and passing through said slats and projecting out beyond the same, so as to make a fastening for the cords or ties around the thatch or covering hereinafter mentioned. Said pins or bolts pass loosely through said holes in the slats, so as not to interfere with the portability of said frame when I desire to take it down. Below said points, h h, &c., on said slats, and about midway between that and the lower end of the slats, I firmly set in said slats at 1, wooden pins or iron bolts, projecting outwardly as a support around which to tie a cord, against which cord to rest the thatch or covering hereinafter described, and to support the tie or cord outside of said covering. Before I set the frame over the tree, I tie in to the stake, E, such portion of the tree top as would project beyond the frame-work. I then, with the frame-work being put up, cover the frame by a straw thatch such as K, shown in the drawings, using successive tiers thereof when necessary, according to the height of the frame, and lashing them with twine or straw rope supported and kept to their places by the conical shape of the frame and by the projecting pins or bolts at h and 1. Instead of a straw thatch as shown, for convenience and economy I also use a covering of corn fodder, also of hemp, also of loose threshed straw, lashed by successive tiers with twine or straw rope around said frame. When mice, gophers, and other rodents, are attracted by the shelters, such as above described, especially when the covering is of corn fodder in which remain grains of corn, I protect the lower ends of the trunks of trees, (that being the only part ever gnawed or attacked by vermin,) by a device as shown in the drawings; thus, around the lower end of the trunk of the tree, I wrap a scroll of sheet tin or other metal, L, as shown in the drawings. I lash this scroll around the tree by one or more elastic bands so as to permit the same to expand as the tree grows. The scroll is made to lap so as to keep the tree protected as it grows. At the upper edge of the metallic scroll, I make a flange, giving it a slight funnel shape. In this, I deposit ashes or lime, which is gradually washed by the rains down to the roots of the tree and expels worms and other insidious vermin. As a secondary advantage of this scroll in the summer time, I leave it on peach trees as a protection against the peach grub.

What I claim as my invention, and desire to secure by Letters Patent, is—

The cap A, stake E, slats C, and braces D, in combination with the thatch K, as and for the purpose set forth.

FRANCIS CLYMER.

Witnesses:
   S. R. HARRIS,
   JOHN SMITH.